United States Patent
Bitterlich et al.

(10) Patent No.: US 8,216,342 B2
(45) Date of Patent: Jul. 10, 2012

(54) MEMBRANE PRODUCTION METHOD

(75) Inventors: Stefan Bitterlich, Dirmstein (DE); Hartwig Voβ, Frankenthal (DE); Gunter Schuch, Ludwigshafen (DE); Armin Diefenbacher, Germersheim (DE); Manfred Noack, Berlin (DE); Ronald Schäfer, Aalen (DE); Ingolf Voigt, Jena (DE); Hannes Richter, Hermsdorf (DE); Jürgen Caro, Hanover (DE)

(73) Assignee: BASF SE (DE)

( * ) Notice: Subject to any disclaimer, the term of this patent is extended or adjusted under 35 U.S.C. 154(b) by 484 days.

(21) Appl. No.: 10/585,719

(22) PCT Filed: Jan. 13, 2005

(86) PCT No.: PCT/EP2005/000270
§ 371 (c)(1),
(2), (4) Date: Jul. 11, 2006

(87) PCT Pub. No.: WO2005/068056
PCT Pub. Date: Jul. 28, 2005

(65) Prior Publication Data
US 2008/0047427 A1    Feb. 28, 2008

(51) Int. Cl.
*B01D 53/22* (2006.01)
(52) U.S. Cl. ............... 95/45; 55/DIG. 5; 55/524; 95/43; 96/4; 96/10
(58) Field of Classification Search ............... 55/DIG. 5, 55/524; 95/45, 43; 96/10, 4
See application file for complete search history.

(56) References Cited

U.S. PATENT DOCUMENTS

| | | | |
|---|---|---|---|
| 4,865,630 A * | 9/1989 | Abe | 96/11 |
| 6,090,289 A * | 7/2000 | Verduijn et al. | 210/644 |
| 6,177,373 B1 | 1/2001 | Sterte et al. | |
| 6,228,800 B1 * | 5/2001 | Yamaguchi et al. | 502/339 |
| 6,472,016 B1 | 10/2002 | Soria et al. | |
| 2007/0084344 A1 * | 4/2007 | Moriya et al. | 95/210 |
| 2008/0131334 A1 * | 6/2008 | Kawamura et al. | 422/169 |

FOREIGN PATENT DOCUMENTS
EP    1 144 099    10/2001
(Continued)

OTHER PUBLICATIONS

Bein (Synthesis and Applications of Molecular Sieve Layers and Membranes) Chem. Mater. 1996, 8, 1636-1653.*

(Continued)

*Primary Examiner* — Jason M Greene
*Assistant Examiner* — Anthony Shumate
(74) *Attorney, Agent, or Firm* — Connolly Bove Lodge & Hutz LLP

(57) ABSTRACT

A method for producing membranes which contain at least one solid layer on one side of a porous substrate by treating the side of the support, which is to be coated, with a synthetic solution that forms the solid layer. The inventive method is characterized in that the space located behind the side of the porous support, which is not to be coated, is filled with an inert fluid during the production of the solid layer on the porous support, "behind" being from the perspective of the support. The pressure and/or the temperature of the fluid is/are selected such that the synthetic solution is essentially prevented from entering in contact with the side of the porous support, which is not to be coated.

6 Claims, 1 Drawing Sheet

FOREIGN PATENT DOCUMENTS

| | | |
|---|---|---|
| WO | WO-00/20105 | 4/2000 |
| WO | WO 2004098751 A1 * | 11/2004 |

OTHER PUBLICATIONS

Liu et al. (Synthesis of TS-1 using amorphous SiO2 and its catalytic properties for hydroxylation of phenol in fixed-bed reactor) Applied Catalysis A: General 293 (2005) 153-161.*

Masuda et al. (Preparation of an A-type zeolite film on the surface of an alumina ceramic filter) Microporous Materials 3 (1995) 565 571.*

Zaspalis et al. (Synthesis and characterization of primary alumina, titania and binary membranes) Journal of Materials Science 27 (1992) 1023-1035.*

Kondo et al. (Tubular-type pervaporation module with zeolite NaA membrane) Journal of Membrane Science 133 (1997) 133-141.*

Worathanakul et al. (New SUZ-4 Zeolite Membrane from Sol-Gel Technique) Summer 2008, International Journal of Chemical and Biomolecular Engineering 1;3, pp. 131-135.*

The American Heritage Dictionary of the English Language: Fourth Edition, 2000, Houghton Mifflin Company, page unknown.*

H. Richter et al., Preparation of Zeolite Membranes on the Inner Surface of Ceramic Tubes and Capillaries, Separation and Purification Technology 32 (2003), pp. 133-138.

F. Kohlrausch, Praktische Physik, 21st Edition, 1960, vol. I, p. 188-189.

A.E. Persson, "The Synthesis of Discrete Colloidal Particles of TPA-Silicalite-1", Zeolites, 1994, vol. 14, September/October, pp. 557-567.

H. Richter et al., Preparation of Zeolite Membranes on the Inner Surface of Ceramic Tubes and Capillaries, Elsevier, Separation and Purification Technology 32, 2003, pp. 133-138.

Jonas Hedlund et al.,"Synthesis of Ultra Thin Films of Molecular Sieves by the Seed Film Method", *Progress in Zeolite and Microporous Materials*, Elsevier, Amsterdam, 1997, pp. 2203-2210.

* cited by examiner

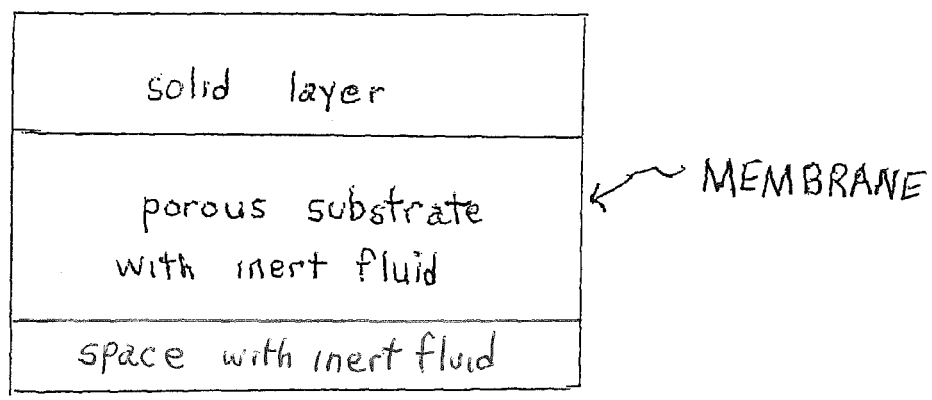

MEMBRANE PRODUCTION METHOD

RELATED APPLICATIONS

This application is a national stage application (under 35 U.S.C. 371) of PCT/EP2005/000270 filed Jan. 13, 2005, which claims benefit to German application 10 2004 001 975.4 filed Jan. 13, 2004.

The present invention relates to a process for the production of membranes which contain at least one functional layer on at least one porous substrate by treating with a synthesis solution that side of the substrate which is to be coated.

Processes for the production of membranes are known. For example, U.S. Pat. No. 6,090,289 describes a process for the production of zeolite membranes, the process comprising bringing molecular sieve crystals having a particle size of at least 1 μm into contact with a substrate material, bringing the substrate material thus coated into contact with a molecular sieve synthesis solution and finally subjecting the coated substrate to a hydrothermal synthesis.

U.S. Pat. No. 6,177,373 describes a process for the production of zeolite membranes, in which microcrystals of the molecular sieve are applied to the substrate material in a first step as a monolayer. In a subsequent second process step, crystal growth is effected to give a thin, continuous and dense film on the substrate material.

Both processes of the prior art are generally carried out in such a way that the substrate material is brought into contact with a solution (synthesis solution) from which zeolite crystals form under hydrothermal conditions.

WO 00/20105 describes a process for the production of microporous membranes on mesoporous and/or macroporous ceramic multichannel tubes, only the channels, but not the outside of the element, being coated. In such production processes, the object is to avoid contact of the synthesis solution with certain surfaces of the porous substrate material or to keep its pore structure free from the synthesis solution so that this surface is not covered by the layer to be deposited.

EP 1 144 099, which describes a process for the production of membranes, achieves this object by impregnating the porous substrate material with an inert solution before said material is brought into contact with the synthesis solution.

U.S. Pat. No. 6,090,289 and U.S. Pat. No. 6,177,373 achieve this object by providing the substrate with a temporary or permanent barrier layer in the parts which are not to be coated before said substrate is brought into contact with the synthesis solution. This barrier layer prevents penetration of the synthesis solution into the pores of the substrate in the parts not to be coated. The temporary barrier layer is removed again after the treatment of the substrate material with the synthesis solution. This can be effected, for example, by evaporation. Examples of suitable temporary barrier layers are water or glycol. A permanent barrier layer on the other hand remains on the porous substrate after the substrate material has been brought into contact with the synthesis solution. Metal oxides are an example of this.

A disadvantage of the barrier layers mentioned above is that the application thereof requires an additional operation. In the case of the temporary barrier layer, a further operation is moreover necessary for removing the barrier layer.

It is an object of the present invention to provide a process for the production of membranes which makes it possible to coat only certain regions of the substrate material and which avoids the complicated processes of the prior art.

We have found that this object is achieved by a process for the production of membranes which contain at least one solid layer on one side of a porous substrate by treating, with a synthesis solution forming the solid layer, that side of the substrate which is to be coated.

In the novel process, during the production of the solid layer on the porous substrate, the substrate itself is partly or completely filled with an inert fluid and the space which is in contact with that side of the porous substrate which is not to be coated is filled with said fluid, the pressure and/or the temperature of the fluid being chosen so that contact of the synthesis solution with that side of the porous substrate which is not to be coated is substantially prevented. The term synthesis solution is not limited to clear solutions; rather, in the novel process, the synthesis solutions may also contain colloidal or particulate components.

A BRIEF DESCRIPTION OF THE FIGURE

FIG. 1 illustrates the membrane according to the invention.

In the context of the present invention, substantially is understood as meaning that at least 90%, preferably at least 95%, particularly preferably at least 99%, of that side of the porous substrate which is not to be coated is not covered with the synthesis solution.

The novel process is particularly suitable for the production of composite membranes for separations of substances. These membranes generally consist of a substrate, which is composed of one or more macroporous and/or mesoporous layers, and a separation layer which is pore-free or microporous or has pores which are smaller than those of the substrate. The separation layer which generally accounts for only a small part of the membrane thickness, effects the separation of substances, while the substrate material ensures the mechanical stability of the membrane. The membranes produced by the novel process are preferably organic, organic/inorganic or inorganic. It is particularly preferred if the membrane is inorganic.

Coating Process

In the novel process, the membranes are produced by treating with a synthesis solution that side of the porous substrate which is to be coated, the substrate itself being partly or completely filled with an inert fluid and the space which is in contact with that side of the porous substrate which is not to be coated being filled with said fluid, and the pressure and/or the temperature of the fluid being chosen so that contact of the synthesis solution with that side of the porous substrate which is not to be coated is prevented.

It is preferable if the state of the fluid is established by the pressure of the fluid. Thus, it is particularly preferable if the pressure of the fluid is kept at a value which corresponds to at least the pressure of the synthesis solution when the contact angle made by synthesis solution and substrate material is less than 90°. If the contact angle of synthesis solution and substrate material is greater than 90°, it is preferable if the pressure of the fluid is kept at a value which corresponds to not more than the pressure of the synthesis solution. If the contact angle made by synthesis solution and substrate material is 90°, the pressure of the fluid is equal to the pressure of the synthesis solution. Regarding the definition of the contact angle, reference is made to Kohlrausch, Praktische Physik, 21st Edition 1960, Vol. I, page 188.

If an aqueous synthesis solution is used, the following is applicable: if the substrate is hydrophilic, the contact angle is less than 90° since the membrane will be wetted. If the substrate is hydrophobic, the contact angle is greater than 90°.

The pressure may be established in any desired manner, for example by hydrostatic arrangements, pumps, valves, compressed gas containers or suitable combinations thereof.

In a further embodiment of the present invention, it is preferable if the temperature difference between fluid and the synthesis solution is not more than 20° C., particularly preferably not more than 10° C., in particular not more than 5° C.

Where diffusion of components of the synthesis solution into the fluid and/or in the opposite direction is possible, the synthesis solution and/or the fluid can be completely or partly presaturated with the components whose diffusion is to be prevented or slowed down in each case. Partial presaturation of the synthesis solution or of the fluid is understood as meaning that the fluid is presaturated with in each case at least 50%, preferably at least 90%, particularly preferably at least 99%, based on the saturation limit of the component whose diffusion is to be prevented or slowed down, in the respective fluid or of the fluid in the respective synthesis solution.

If, for example, an aqueous synthesis solution and a gaseous fluid is used, the gaseous fluid can be presaturated with water before deposition of the layer on the substrate. It is just as possible for either the fluid or the synthesis solution to be saturated with another, but inert substrate.

During the deposition of the synthesis solution on the substrate, the synthesis solution may be stationary, moved one or more times or exchanged or, in a particularly preferred embodiment of the novel process, kept moving in a specific direction for at least 90%, preferably at least 95%, of the time required for the production of the separation layer. This prevents local depletion of membrane-forming material occurring during the time of contact of the synthesis solution with the substrate and the local density differences thus caused from leading to convection flows and to fluctuations of the concentration, which are difficult to calculate in their effect and make reproducible production, in particular of very thin separation layers, more difficult. Such a membrane synthesis with movement in a specific direction is described, for example, in: H. Richter, I. Voigt, G. Fischer, P. Puhlfür B, $7^{th}$ International Conference on Inorganic Membranes, Dalian, China, Jun. 23-26, 2002; Separation and Purification Technology 32 (2003), 133-138.

If the synthesis solution is moved in a specific direction in the novel process, the flow rate of the synthesis solution should preferably be from 0.001 to 100, particularly preferably from 0.01 to 10, in particular from 0.01 to 5, cm/min. In a further preferred embodiment of the novel process, the flow rate is established so that the pressure drop of the synthesis solution while flowing over the substrate is preferably less than 0.1, particularly preferably less than 0.01, in particular less than 0.002, bar.

Synthesis solution may flow over in a single pass, i.e. the solution is fed by means of gravity or by a pump from a reservoir over the substrate and from there into a collecting vessel. Alternatively, however, the synthesis solution can also be circulated over the substrate by means of a pump. It is furthermore possible to pass the synthesis solution back and forth between two reservoirs over the substrate using pumps or gas pressure.

The coating is preferably effected at from 100 to 250° C., particularly preferably from 140 to 210° C., in particular from 170 to 190° C.

During the coating with the membrane-forming material of the synthesis solution, the substrate is preferably installed in an apparatus.

During the production process, that surface of the substrate material which is to be coated can be installed perpendicularly, obliquely or horizontally, preferably horizontally, in the apparatus, the last-mentioned variant being particularly advantageous owing to the equalization of the pressure difference between synthesis solution and fluid.

The novel process for the production of membranes, which contain at least one layer on at least one porous substrate, by treating with a synthesis solution that side of the substrate which is to be coated can be integrated in an overall process for the production of a membrane. A step preceding the novel process may be the application of crystallization nuclei on the substrate. A downstream step may be, for example, the thermal treatment of the membrane for removing volatile or thermally decomposable components, if appropriate after washing for removing components which impair the thermal stability.

If the application of crystallization nuclei is effected before the novel process, this can be effected, for example, by a hydrothermal crystallization. Thus, processes for hydrothermal synthesis of zeolite seed layers are known per se to a person skilled in the art. A solution suitable for this purpose may contain a silicon source, an aluminum source, an alkali source, a template and water. An example of this is the use of $SiO_2$, NaOH, tetrapropylammonium compounds as a template and water.

The coating is also followed, if appropriate, by washing of the membrane produced, for example with water, preferably with distilled water.

The sealing of the space filled with the synthesis solution from the space filled with fluid can be effected either by means of seals comprising organic polymeric material, for example comprising PTFE, comprising elastomers such as Viton® or Kalrez®, or comprising graphite or composite materials. Alternatively, it is also possible for the substrate to be part of a body which separates the space filled with the synthesis solution from the space filled with fluid, as is the case, for example, in an arrangement in which the porous ceramic substrate is part of a fully ceramic module.

The abovementioned thermal aftertreatment can be carried out, for example, as a function of the method of sealing, if appropriate after the membrane produced has been removed from the apparatus used for the coating. Alternatively, however, it is possible also to heat the apparatus in which the substrate may have been installed during the coating.

Solid Layer

The solid layer applied to the porous substrate in the novel process is preferably pore-free, or microporous or has pores which are smaller than the pores of the substrate layer. In a particular embodiment of the present invention, the pore size of the layer produced in the novel process on the substrate is from 0.3 to 100 nm, particularly preferably from 0.4 to 10 nm, in particular from 0.4 to 1, nm.

The layer applied to the porous substrate is particularly suitable for separating substances. Examples of this are gas separations, such as the separation of hydrogen or oxygen from gas mixtures, the separation of steam from vapor or gaseous mixtures, the separation of olefins and paraffins, the separation of aromatics and aliphatics and the separation of linear and branched hydrocarbons.

In addition, the layers should also preferably be suitable for separating water from liquid mixtures by means of pervaporation and for the nano-, micro- or ultrafiltration of fluid mixtures.

It is particularly preferable if the layer applied to the porous substrate in the novel process consists of a crystalline or amorphous material. If the layer consists of a crystalline material, this is preferably selected from the group consisting of zeolites or mixed-conductivity oxides having a perovskite or perovskite-like structure. If the layer applied to the substrate material consists of an amorphous material, this amorphous material is preferably selected from the group consisting of metal oxides, for example amorphous silica, titania or zirconia.

Fluid

The fluid used in the novel process is preferably liquid or gaseous.

If the fluid used in the novel process is gaseous, it is preferably selected from the group consisting of air and nitrogen. If a liquid fluid is used in the novel process, it is preferable if the liquid contains no membrane-forming material. If it is a liquid, the fluid can be selected, for example, from the group consisting of water and liquids which form a miscibility gap with the synthesis solution.

Substrate

The porous substrate used in the novel process preferably consists of a material selected from the group consisting of aluminum oxides, titanium oxides, zirconium oxides, magnesium oxides, metals and carbon. It is furthermore preferable if the substrate material contains metals in the form of porous sintered bodies. The substrate material should substantially ensure the mechanical stability of the membrane produced according to the invention.

The material of the porous substrate preferably has pore diameters of from 1 nm to 100 µm, particularly preferably from 5 nm to 10 µm, in a preferred embodiment the substrate being composed of a plurality of regions having different mean pore diameters, and the mean pore diameters decreasing toward that side of the substrate which is to be coated.

The substrate materials coated by the novel process may have the form of individual tubes, the coating being effected on the outside or, particularly advantageously, on the inside. Alternatively, however, it is also possible to use all multichannel elements which are known per se to a person skilled in the art and where the coating is effected in general on the inside of the channels. In addition, it is possible for the substrate material to comprise capillaries or flat bodies, coating being effected on the outside or, particularly preferably, on the inside, particularly in the case of the capillaries.

The ends of the substrate are preferably pretreated so that mass transfer between that side of the substrate which is to be coated and that side not to be coated and not taking place via that side of the substrate which is to be coated or the coated side of the substrate is suppressed. This can be done, for example, by applying a dense material, for example one of the glass solders known per se, which covers the substrate at least in the part where it is sealed in during the synthesis and in the part where the membrane produced in the novel process is sealed in. In the case of a tubular or multichannel geometry of the substrate, the dense material preferably also covers the end face of the tube or multichannel element.

The present invention furthermore relates to the membranes produced by the novel process and containing a solid layer on a porous substrate.

The present invention furthermore relates to the use of the membranes, produced by the novel process, for gas separations, for example for the separation of hydrogen or oxygen from gas mixtures, the separation of steam from vapor or gaseous mixtures, the separation of olefins and paraffins, the separation of aromatics and aliphatics, the separation of linear and branched hydrocarbons. Further uses of the membranes produced by the novel process are the separation of water from liquid mixtures by means of pervaporation and the nano-, ultra- or microfiltration of fluid mixtures.

In addition, the membranes produced by the novel process or the novel membranes can be used in membrane reactors in which at least one reactant, for example hydrogen or oxygen, is fed via the membrane to the reaction space, for example a catalyst bed, or at least one reaction product, for example hydrogen, is removed via the membrane from the reaction space, for example a catalyst bed.

The examples which follow illustrate the invention.

WORKING EXAMPLES

Example 1

A single-channel tube from Inocermic (Hermsdorf, Germany) comprising $\alpha$-$Al_2O_3$ (external diameter 10 mm, internal diameter 7 mm, length 300 mm) and having an asymmetric structure and a mean pore diameter of 60 nm on the inside, provided at both ends over a length of in each case 20 mm with a glass coating, is first seeded as follows:

The seed suspension is prepared by the method of Persson et al. (Zeolites 14 (1994), 557 et seq.) by hydrothermal crystallization from a solution having the molar composition
9 of tetrapropylammonium hydroxide (1 M aqueous solution, from Sigma),
25 of $SiO_2$ (Köstrosol 0830, Chemiewerk Köstritz),
360 of $H_2O$,
100 of EtOH
over 2 weeks at 60° C.

The colloid seed crystals are separated from the mother liquor by centrifuging, washed several times with water and then brought to a solids content of 2% by mass.

The seeding of the abovementioned single-channel tube is effected by a method described by Hedlund et al. (in H. Chon, S.-K. Ihm, Y. S. Uh (Eds.), Progress in Zeolites and Microporous Materials, Elsevier, Amsterdam, 1997, 2203 et seq.), the single-channel tube being immersed for 10 min in a 0.4% strength by weight solution of the cationic polymer Redifloc 4150 (from Nobel A B, Sweden) and then for a further 10 minutes in the seed solution. After each operation, the substrate is washed with distilled water. The single-channel tube treated in this manner is left for 12 hours at room temperature in the air for drying and is then heated at 1 K/min to 450° C., kept at 450° C. for one hour and then cooled again at 1 K/min.

The single-channel tube is then installed in an apparatus A in such a way that the tube divided the internal volume of the apparatus into an internal tube space and an external tube space, which are sealed from one another by means of two O-rings (Viton®) surrounding the tube in the region of the two glass coatings. The apparatus has a feed line to the internal tube space at one end of the tube and a discharge line from the internal tube space at the other end of the tube, and a feed line to the external tube space. The apparatus is part of a synthesis apparatus which is designed so that the apparatus stood vertically, its lower feed line to the internal tube space is connected via a line to a reservoir B and its upper discharge line from the external tube space is connected via a line to condenser K (coiled pipe immersed in cooling water), to which an apparatus for maintaining the pressure, e.g. a needle valve, is connected. The reservoir B has a feed line at the uppermost point. This feed line and the feed line to the external tube space of the apparatus A are connected via lines and via a T-piece to the reducing valve of a nitrogen cylinder. The apparatus A and about 300 mm of the line to the feed line leading to the internal tube space are immersed in a thermostatable oil bath.

A synthesis solution having the following composition is introduced into the reservoir:
0.035 of tetrapropylammonium bromide (purum, from Fluka),
1 of $SiO_2$ (Köstrosol 0830, Chemiewerk Köstritz), 85 of H$_2$O,
0.035 of Na$_2$O (as NaOH pellets, from Merck).

The feed line to the reservoir B and the feed line to the external tube space of the apparatus A are connected separately via lines to the reducing valves of two nitrogen cylinders. A pressure of 9 bar (gage pressure) is established at the reducing valve connected to the feed line to the reservoir B, and a pressure of 9.5 bar (gage pressure) is established at the reducing valve connected to the feed line to the external tube space of the apparatus A. The oil bath in which the apparatus A is present is heated to 150° C. The needle valve downstream of the condenser K is opened so that there is a flow through the arrangement from container B via the apparatus A and the condenser K. The needle valve is adjusted so that a flow rate of 0.25 cm/min resulted in the single-channel tube, the amount which has flowed through being measured by means of a calibrated collecting vessel placed downstream of the needle valve. The flow is maintained for 72 hours. The oil bath temperature is then reduced to 90° C. in the course of 30 minutes. The membrane is removed from the apparatus A, thoroughly washed with 5 l of distilled water and then heated at 450° C. under air by heating at 1 K/min to 450° C., keeping at 450° C. for one hour and then cooling again at 1 K/min.

The membrane thus produced is used for carrying out permeation measurements with hydrogen and sulfur hexafluoride. The measurement is effected in a test cell in which a membrane is sealed in by means of Viton O-rings. First, the cell is heated to 110° C. Thereafter, the feed space of the test cell (inside of the membrane tube) and the permeate space (outside of the membrane tube) are evacuated to $10^{-4}$ mbar absolute and kept at this pressure for 30 minutes. The feed side is then filled with the measuring gas (H$_2$ or SF$_6$) so that a feed pressure of 1 bar absolute resulted. The permeance Q for the respective gas is calculated from the variation of the pressure increase as a function of time on the permeate side. This is obtained from the initial increase in the variation of the permeate pressure as a function of time, according to the following equation $$Q = V_{Permeate}/(RT) \cdot (dp_{Permeate}/dt)_{t=0}.$$

The results are shown in table 1.

The permeance mentioned there is defined as the flux density of the respective gas, divided by the transmembrane pressure difference.

Example 2

Comparative Example

The procedure is as in example 1, except that Teflon tape was wound round the single-channel tube before installation in the apparatus A, and the outside is brought into contact with synthesis solution during the synthesis.

The results of the permeation measurements with the membrane thus produced are likewise shown in table 1.

Comparison of the measured data shows that the membrane produced by the novel process has a substantially higher permeance for both individual substances, at about the same permselectivity.

TABLE 1

| Production process according to example | H$_2$ permeance mol/(m$^2$h bar) | SF$_6$ permeance mol/(m$^2$h bar) | Permselectivity H$_2$/SF$_6$ |
|---|---|---|---|
| 1 | 705 | 36 | 19.4 |
| 2 | 426 | 22 | 19.7 |

We claim:

1. A process for the production of membranes, which contain at least one solid layer on one side of a porous substrate, which comprises treating,
   with synthesis solution forming the solid layer,
   that side of the substrate which is to be coated,
   wherein, in the production of the solid layer on the porous substrate, the substrate itself is partly or completely filled with an inert fluid and
   the space which is in contact with that side of the porous substrate which is not to be coated is filled with an inert fluid,
   the pressure and/or the temperature of the fluid being chosen so that contact of the synthesis solution with that side of the porous substrate which is not to be coated is substantially prevented,
   wherein the fluid is gaseous, and
   wherein the pressure of the fluid during the production of the solid layer is kept at a value which corresponds to the solution where the contact angle formed by the synthesis solution and substrate material is less than 90° or wherein the pressure of the fluid during the production of the solid layer is kept at a value which corresponds to not more than the pressure of the synthesis solution where the contact angle made by synthesis solution and substrate material is greater than 90° and
   wherein the inert fluid is nitrogen and wherein the space filled with the synthesis solution is sealed from the space filled with the fluid.

2. The process according to claim 1, wherein the substrate contains material which is selected from the group consisting of aluminum oxide, titanium oxide, zirconium oxide, magnesium oxide, metal and carbon.

3. The process according to claim 1, wherein the layer consists of a crystalline material which is selected from the group consisting of zeolites and mixed-conductivity oxides having a perovskite structure.

4. The process according to claim 1, wherein the layer consists of an amorphous material which is metal oxides.

5. The process according to claim 2, wherein the layer consists of a crystalline material which is selected from the group consisting of zeolites and mixed-conductivity oxides having a perovskite structure.

6. A process according to claim 5, wherein the layer consists of an amorphous material which is metal oxides.

* * * * *